United States Patent
Fatemi et al.

(10) Patent No.: US 12,438,250 B2
(45) Date of Patent: Oct. 7, 2025

(54) METHODS AND SYSTEMS FOR PROVIDING QUANTUM COMPUTER INTERFACE

(71) Applicant: California Institute of Technology, Pasadena, CA (US)

(72) Inventors: Seyed Mohammadreza Fatemi, Pasadena, CA (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 1134 days.

(21) Appl. No.: 17/188,358

(22) Filed: Mar. 1, 2021

(65) Prior Publication Data

US 2021/0272007 A1   Sep. 2, 2021

Related U.S. Application Data

(60) Provisional application No. 62/982,937, filed on Feb. 28, 2020.

(51) Int. Cl.
| | |
|---|---|
| *H01P 5/12* | (2006.01) |
| *B82Y 10/00* | (2011.01) |
| *H03K 19/195* | (2006.01) |
| *H10N 99/00* | (2023.01) |

(52) U.S. Cl.
CPC ............ *H01P 5/12* (2013.01); *H03K 19/195* (2013.01); *H10N 99/05* (2023.02); *B82Y 10/00* (2013.01)

(58) Field of Classification Search
CPC ........ H01P 5/12; H10N 99/05; H03K 19/195; B82Y 10/00
USPC .......................................................... 398/141
See application file for complete search history.

(56) References Cited

U.S. PATENT DOCUMENTS

| | | | | |
|---|---|---|---|---|
| 11,442,228 | B2 * | 9/2022 | Nahmias | G06E 3/008 |
| 11,475,347 | B1 * | 10/2022 | Rudolph | G02B 6/12 |
| 11,558,069 | B1 * | 1/2023 | Sparrow | G06N 10/40 |
| 12,141,664 | B2 * | 11/2024 | Rigetti | G06F 13/36 |
| 2001/0024543 | A1 * | 9/2001 | Ahmadvand | G02B 6/29355 |
| | | | | 385/24 |
| 2003/0053180 | A1 * | 3/2003 | Carey | H04B 10/506 |
| | | | | 398/183 |
| 2015/0354938 | A1 * | 12/2015 | Mower | G06N 10/60 |
| | | | | 356/450 |
| 2018/0076259 | A1 * | 3/2018 | Park | G01S 7/4914 |
| 2020/0382217 | A1 * | 12/2020 | Younce | H04B 10/614 |
| 2021/0271999 | A1 * | 9/2021 | Paik | G06E 1/00 |

\* cited by examiner

*Primary Examiner* — Dalzid E Singh
(74) *Attorney, Agent, or Firm* — GATES & COOPER LLP

(57) ABSTRACT

An interface for communicating with qubits, the interface including one or more splitters splitting a plurality of signals from a modulated optical carrier and outputting the signals to a plurality of outputs. In one example, the signals include a plurality of different input signals used for exciting or controlling the one or more qubits. In another example, the signals include a plurality of output signals received from the one or more qubits, wherein the output signals used to read one or more states of the one or more qubits.

20 Claims, 13 Drawing Sheets

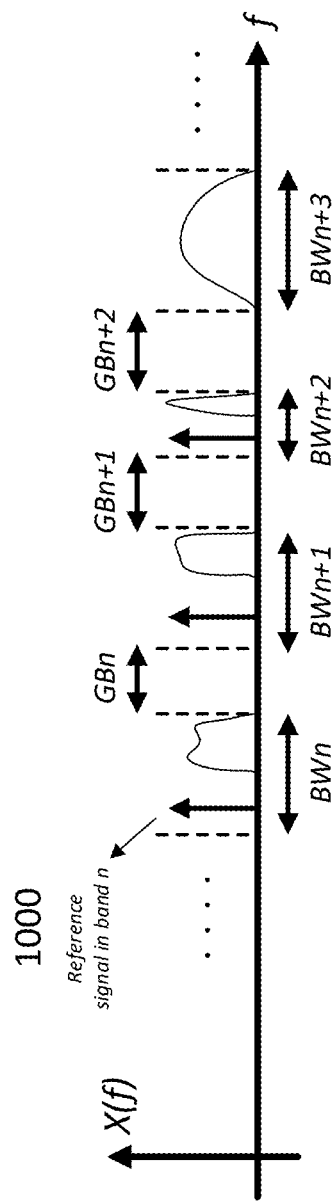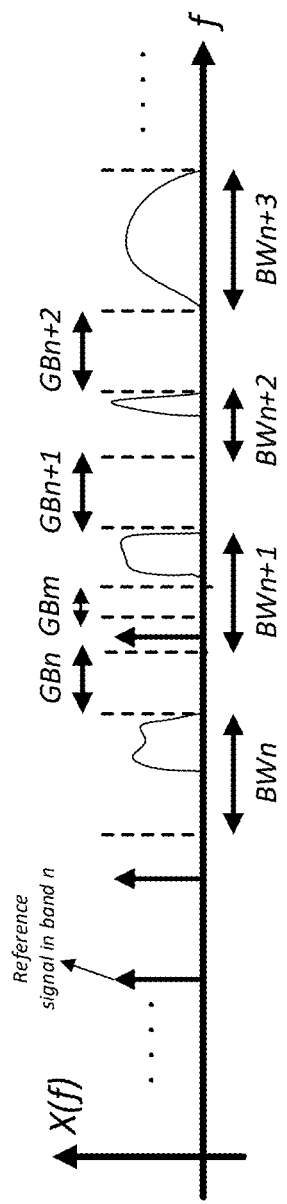
Figure 10A
Figure 10B

METHODS AND SYSTEMS FOR PROVIDING QUANTUM COMPUTER INTERFACE

CROSS REFERENCE TO RELATED APPLICATIONS

This application claims the benefit under 35 USC 119(e) of commonly assigned U.S. Provisional Patent Application Ser. No. 62/982,937, filed Feb. 28, 2020, by Seyed Mohammadreza Fatemi and Seyed Ali Hajimiri, entitled "METHODS AND SYSTEMS FOR PROVIDING QUANTUM COMPUTER INTERFACE", which application is incorporated by reference herein.

BACKGROUND OF THE INVENTION

1. Field of the Invention

This invention relates to methods and systems for interfacing with qubits.

2. Description of the Related Art

Certain types of qubits need modulated electromagnetic waves in the RF and microwave domain for operations such as controlling the state of the qubits and measuring their current state (observation of their state). Therefore, multiple input and output signals are required for the operation of each qubit, as illustrated in FIG. 1A. As an example, a typical transmon qubit has XY Drive, Z Drive, and Read out ports. The state of the qubit can be manipulated with microwave pulses that have a carrier with certain frequency and phase, and an envelope that shapes the pulse. In the case of the XY Drive port of a transmon, the pulse characteristics such as phase, amplitude, and duration determines the axis and angle of rotation of the qubit's state vector. In a quantum system (such as a quantum computer) with many qubits, many RF/microwave pulses with defined and controlled shapes need to be fed to the system and the output/reflected waves should be collected and transferred to electronics (usually at a higher temperature) for processing. Spin-qubits are another example that need RF/microwave signal interface for operation. In a quantum computer with a large number of qubits, the interfacing method and system for delivering the required input signals and collecting the output signals has been hindered by unsolved and complicated problems. These problems cannot be addressed by conventional interfacing structures that use one wire per port due to the massive area required by the wires and on-chip pads, as well as inevitable cross-talk between the wires.

What is needed are improved methods and systems for interfacing with qubits. The present disclosure satisfies this need.

SUMMARY OF THE INVENTION

Illustrative, non-exclusive examples of inventive subject matter according to the present disclosure are described in the following enumerated paragraphs.
1. A device, comprising:
   one or more optical splitters splitting a plurality of spectrally separated signals from a carrier (e.g., optical carrier) and outputting the signals to a plurality of outputs, wherein the signals comprise at least one of:
   a plurality of different input signals at least exciting or controlling the one or more qubits, or
   a plurality of output signals received from the one or more qubits, the output signals used to read one or more states of the one or more qubits.
2 The device of example 1, further comprising:
   a photonic integrated circuit comprising the splitters and one or more waveguides coupled to the splitters to transmit the carrier to the splitters; and
   a quantum chip comprising one or more of the qubits, the quantum chip comprising at least a plurality of input ports or a plurality of output ports, wherein:
   each of the input signals are delivered to the quantum chip through a different one of input ports and each of the output signals are outputted from the quantum chip through a different one of the output ports; and
   the quantum chip and the photonic integrated circuit are on separate chips or integrated on the same chip.
3. The device of example 1 or 2, further comprising:
   a modulator modulating a carrier with the plurality of input signals having different frequencies to form the carrier;
   one or more waveguides coupled to the modulator and the splitters to transmit the carrier to the one or more splitters; and
   one or more interfaces for connecting to one or more systems each comprising the one or more qubits, each of the interfaces comprising:
   the one or more splitters; and
   one or more detectors coupled to the outputs of the splitters and detecting each one of the signals, the detectors converting the signals to a plurality of electrical or electromagnetic signals comprising at least one of:
   the input signals inputted to the one or more qubits through different input ports to the qubits, or
   the output signals split from the carrier in the splitters and detected by the detectors after output from the one or more qubits through output ports, modulation on the carrier in the modulator, and transmission on the carrier to the splitters.
4. The device of any of the examples 1-3, wherein the output signals comprise a response of the one or more qubits to an excitation and the electrical or electromagnetic signals are used to measure the one or more states of the one or more qubits.
5. The device of example 3 or 4, wherein:
   the systems comprise one or more quantum chips including the one or more qubits and the device further includes a photonic chip including the detectors and the splitters; and
   the carrier comprises electromagnetic radiation comprising optical or infrared wavelengths transmitted through one of the waveguides.
6. The device of any of the example 3-5, wherein the interfaces comprise:
   a first interface delivering the electrical or electromagnetic signals comprising the one or more input signals to control and/or or excite the one or more qubits; and
   a second interface receiving the output signals from the one or more qubits, the output signals used to read the one or more states of the one or more qubits in response to the input signals.
7. The device of any of the examples 3-6, further comprising:
   a mixer mixing a reference signal with the signals to form modulated signals, wherein the detector comprises a heterodyne detector demodulating each of the modulated signals to obtain the electrical or electromagnetic signals.

8. The device of any of the examples 3-7, wherein the interfaces are connected to the systems so that the output signals received from one or more of the qubits are fed as the input signals to one or more other qubits.

9. The device of any of the examples 1-8, further comprising a plurality of the splitters connected by one or more of the waveguides, each of the plurality of splitters:
   splitting one of the signals from the carrier,
   having one of the outputs and outputting the one of the signals to the one of the outputs, and
   transmitting a remainder of the signals on the carrier through one of waveguides to a next one of the splitters.

10. The device of any of the examples 1-9, further comprising a plurality of the splitters comprising a coarse splitter connected to one or more finer resolution splitters, the coarse splitter splitting the carrier into two or more bands and the one or more finer resolution splitters splitting each of the bands into a plurality of sub-bands or channels each outputted to one of the outputs.

11. The device of any of the examples 1-10, wherein each of splitters comprise a filter or coupler.

12. The device of any of the examples 1-11, wherein each of the splitters comprise a ring resonator.

13. The device of any of the examples 1-12, wherein one or more of the splitters each comprise:
   an input waveguide spatially evanescently coupled to an output waveguide, the input waveguide transmitting the plurality of the signals and the output waveguide evanescently coupling one of the signals from the input waveguide and transmitting the one of the signals to one of the outputs.

14. The device of any of the examples 1-14, wherein one or more of the splitters comprise or are coupled to a dispersive element adjusting at least one of a frequency or shape of the signals.

15. The device of any of the examples 1-14, further comprising a patterned photonic structure including the splitters, wherein:
   the patterned photonic structure comprises a plurality of regions or pixels each having a different refractive index,
   the splitters each comprise one or more of the regions or pixels, and
   the pixels or regions are arranged to tailor or optimize a transfer function of the splitting of the signals from the carrier.

16. The device of example 15, wherein the pixels or regions are arranged to minimize leakage of the signals between the outputs and minimize a guard band between the signals in the carrier.

17. The device of any of the examples 1-16, wherein at least one of the waveguides or the detector comprise walls including at least one of an absorber or reflector blocking or suppressing cross-talk between the signals.

18. The device of any of the examples 1-17, wherein the systems comprise a superconductor, a semiconductor, a magnetic material, or defects in a solid state system.

19. A method of interfacing with one or more qubits, comprising:
   modulating a carrier with different signals having different frequencies;
   transmitting the carrier to one or more splitters;
   splitting the signals from the carrier in the splitters;
   outputting the signals from the splitters from a plurality of outputs;
   detecting each one of the signals outputted from the outputs, the detectors converting the signals to a plurality of electrical or electromagnetic signals; wherein the electrical or electromagnetic signals comprise at least one of:
      input signals delivered to the one or more qubits, or
      output signals split from the carrier in the splitters and detected by the detectors after output from the one or more qubits, modulation on the carrier in the modulator, and transmission on the carrier to the splitters.

BRIEF DESCRIPTION OF THE DRAWINGS

Referring now to the drawings in which like reference numbers represent corresponding parts throughout:

FIG. 3A-3B illustrate an example interface realized by modulated optical carriers transferring and distributing the signals, wherein FIG. 3A shows photonics and qubits integrated on the same substrate and FIG. 3B shows the photonic chip is processing the optics and feeding the quantum chip with the processed signals.

FIG. 5A-5B illustrates example signal splitter blocks, wherein FIG. 5A shows a series chain of splitting blocks that each select one or multiple bands and FIG. 5B shows the realization of the split blocks in FIG. 5A with a chain of tuned ring resonators at specific wavelengths.

FIGS. 7A-7B illustrate signal splitter blocks according to further examples, wherein FIG. 7A shows a series chain of splitting blocks that each split the input signal into multiple sub-bands so that the chain produces the output signals that can have one or multiple bands not necessarily adjacent to each other, and FIG. 7B shows a realization of the signal splitter in which each split block receives multiple inputs.

FIGS. 10A-10B illustrate exemplary schematics of a device processing the optical signal containing one or multiple reference signals, wherein FIG. 10A shows an example wherein the reference signal of each band is inside the band and FIG. 10B shows an example wherein the reference signal of some waveforms might be out-of-band or have their own band.

FIGS. 13A-13C show exemplary schematics of the absorber/reflector wall and enclosures to block/protect the system from stray light, wherein FIG. 13A shows an example including the wall surrounding the coupling port to block the optical part that is not coupled to the chip, FIG. 13B shows an example enclosure of the on-chip waveguides with the absorber/reflector, and FIG. 13C shows an enclosure of the photodetectors to protect them from stray light.

DETAILED DESCRIPTION OF THE INVENTION

Figure 1A:
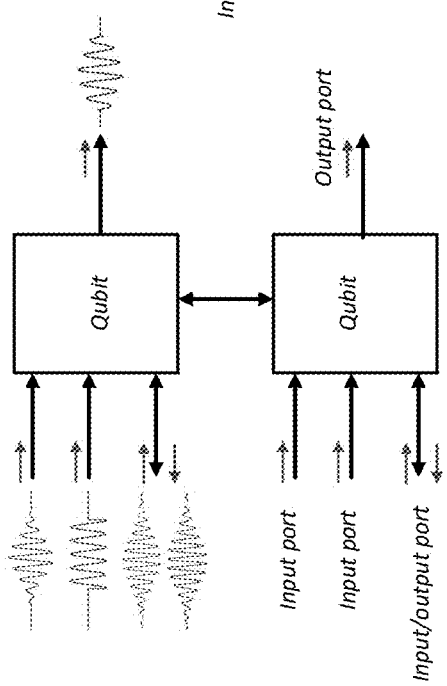
FIG. 1A shows an exemplary schematic of a qubit with two input ports, one input/output port, one output port, and one connection port to another qubit.
Figure 1B:
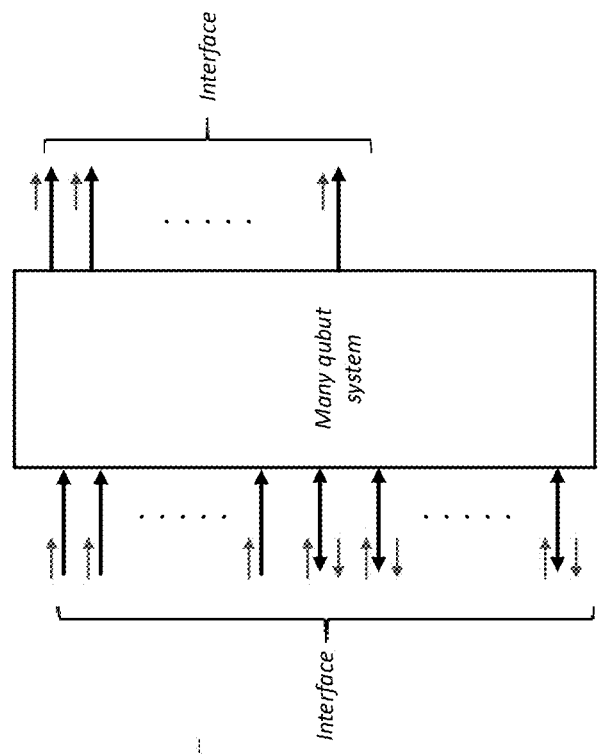
FIG. 1B shows a system of qubits including many ports that need to interface with drivers and receivers to feed the input and collect the output waveforms, respectively. The input and output of this system are microwave/RF pulses.
Figure 2:
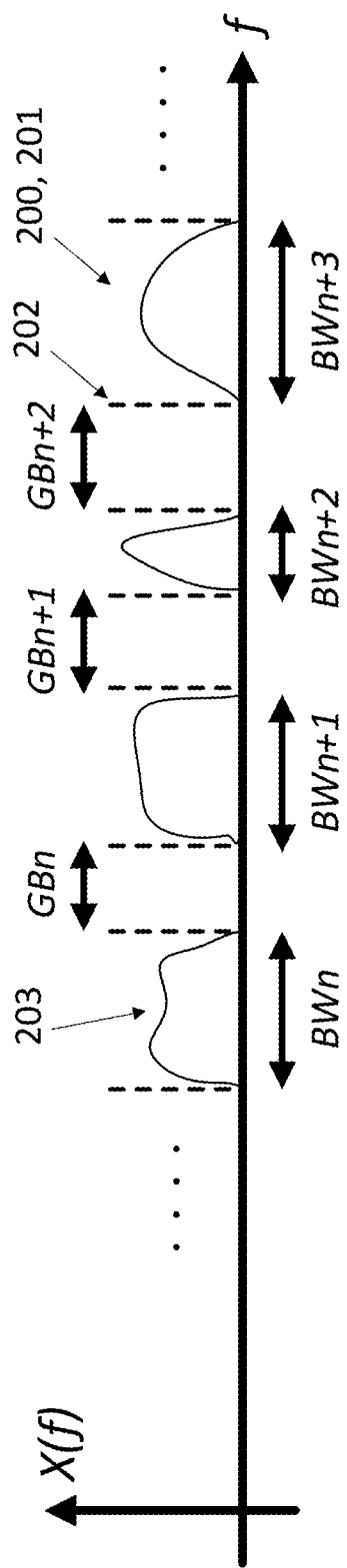
FIG. 2 shows an exemplary spectral content of the optical signal plotting amplitude X as a function of frequency (f). Multiple waveforms with desired bandwidth ($BW_n$ is the bandwidth (BW) of the channel number n) and guard band ($GB_n$ is the guard band (GB) of the channel number n and n+1) spacing in between them are placed on an optical carrier by modulation.

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.
Technical Description The present disclosure describes methods and systems for implementation of a quantum computer interface (other qubit interface) using optical carrier-based signal transfer and distribution. To deliver all or part of the required signals to the quantum chips, carriers (e.g., optical carriers) with the required operation signals modulated on them are used to transfer the signals to the quantum chip or a photonic chip. The signals on the carrier are then separated and distributed on the chip, converted to electrical or electromagnetic signals (e.g., microwave or RF) and used for qubit operation. These methods and systems are, in particular, effective for large scale quantum computers with many qubits integrated on a single or multiple quantum chips that will need a large number of input/output signals. However, these methods and systems can be used for interfacing with a wide variety of quantum systems with any number of qubits.
Example Photonic Interface System The required signals for operating qubits are modulated on one or multiple optical signals that are used as carriers. FIG. 2 illustrates one or a plurality of signals 201 comprising waveforms 200 with equal or different bandwidth BWn are placed on the optical carrier forming the total signal with spectral amplitude X(f). There can be guard bands 202 in between channels with arbitrary width (the bandwidth GBn of the guard bands can be zero or non-zero). Also illustrated in FIG. 2 is the spectral amplitude 203 of the waveform.

Figure 3:
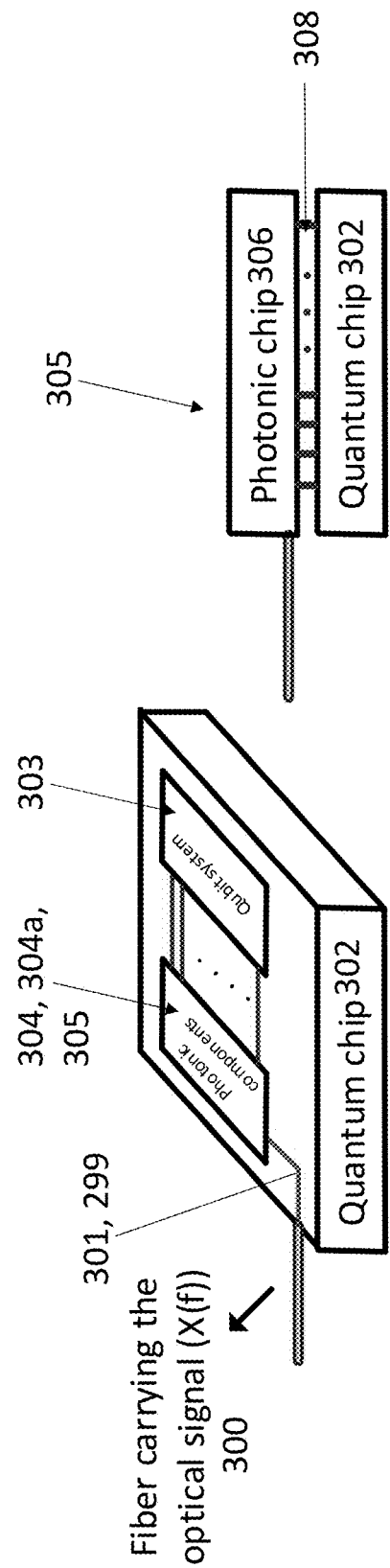

FIG. 3A illustrates an optical fiber 300 delivering a carrier 299 comprising an optical signal 301 to a quantum chip 302, wherein the quantum chip 302 comprises integrated qubits 303 and an interface 305 comprising photonic components 304 and/or a photonic integrated circuit 304a (so that the quantum chip also comprises a photonic chip 306). FIG. 3B illustrates an embodiment wherein the quantum chip 302 is connected to a separate photonic chip 306 (comprising the photonic components), the optical signal 301 is delivered to the photonic chip 306, and the waveforms 200 split from the optical signal in the photonic chip 306 are delivered to the quantum chip 302 through interconnects 308 between the photonic chip and the quantum chip. In the embodiment illustrated in FIG. 3B, the photonic chip is flipped on the quantum chip. In other examples, the quantum chip and the photonic chip are connected through a printed circuit board (PCB) or wires. The quantum chip and the photonic chip can be at the same temperature or at different temperatures.

Figure 4:
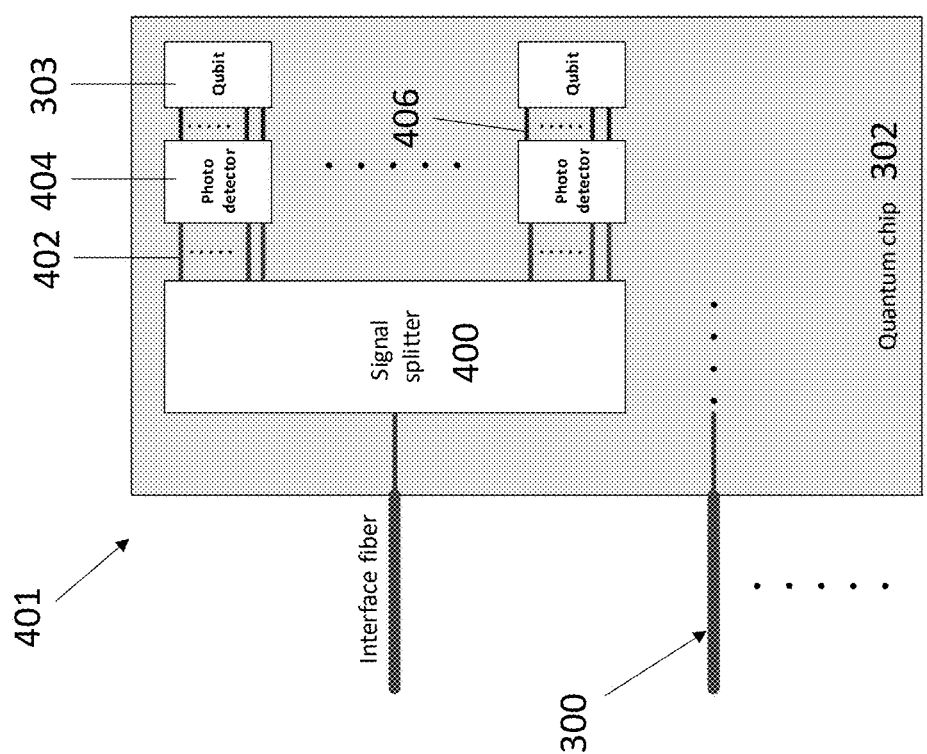
FIG. 4 shows an example quantum chip including the qubits and a photonic signal distribution network.

In one or more embodiments, the modulated signals delivered through the optical fiber are not band limited and the optical signal spectrum is the overlap of the waveforms in the optical signal. In one embodiment, the optical carriers are input to the photonic chip and the photonic chip delivers the output processed light channels to the quantum chip for conversion to electrical or electromagnetic waves and use for qubit operation.
Example Splitters As discussed above, the modulated optical carriers 301 are delivered to the quantum chip 302 or the photonic chip 306. FIG. 4 shows an embodiment of a device 401 (e.g., interface 305) in which one or more optical carriers 301 including signals 200 are delivered to the quantum chip 302 through one or multiple fibers 300 and different bands on the optical signal carrier 301 are then separated on the chip 302 with a signal splitter block 400. The block 400 comprises outputs 501 outputting each waveform 200 on a separate channel 402 and the channels are delivered to photodetectors 404 that generate electrical signals 406 that are used for qubit operation. Each qubit can receive one or multiple channels 402 and each photodetector can receive one or multiple channels and output one or multiple channels. The optical signals (carriers 301) themselves can be used directly as well if needed.

Figure 5B:
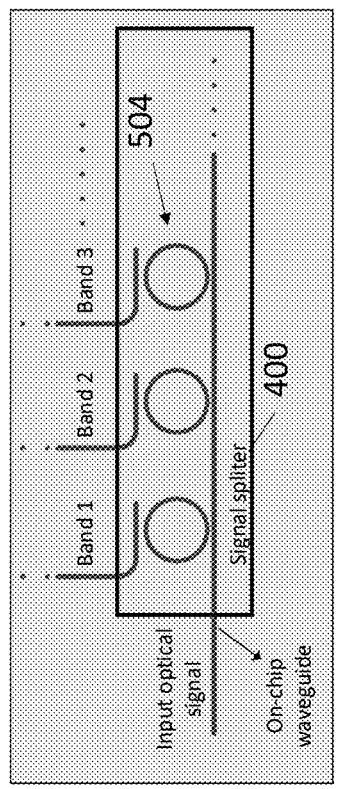
Figure 5A:
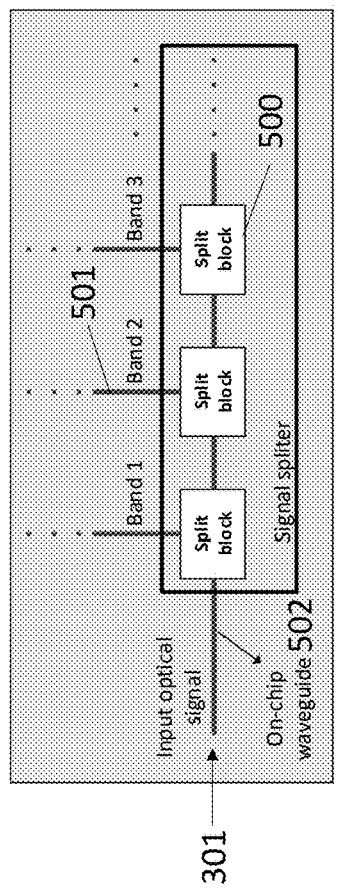

FIG. 5A illustrates an example wherein the signal splitter block 400 includes a chain of blocks (comprising splitters 500) and each of the blocks or splitters 500 separates a single band (e.g., band 1, band 2). The input optical signal carrier 301 is fed to the splitters 500 through an on chip waveguide 502 and the splitters each have an output 501. FIG. 5B illustrates an example wherein these blocks or splitters 500 are ring resonators 504. In one or more embodiments, a set of ring resonators are used to form a narrow-band filter that separates the one or multiple bands (e.g., band 1, band 2, band 3).

Figure 6:
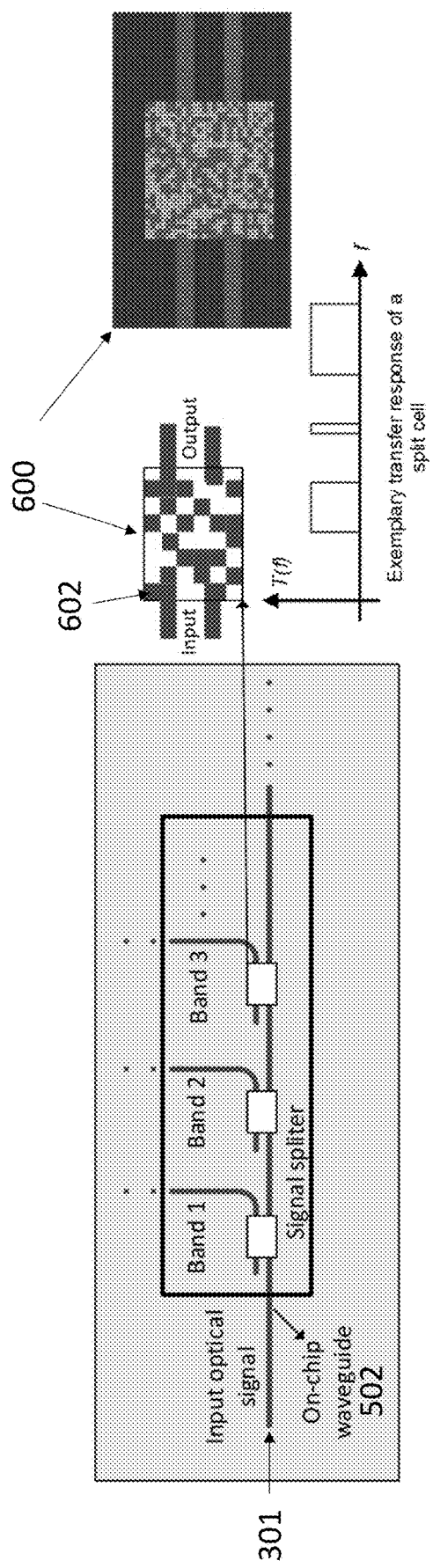
FIG. 6 is an example schematic representation of the signal splitter based on pattern sections that can have a transfer response with a multi-band selection property.

FIG. 6 illustrates an example wherein the splitter block 400, 500 is designed through optimization of a patterned photonic structure 600, wherein the patterned photonic structure includes a plurality of regions or pixels 602 each having a different refractive index.

In one or more examples, the splitter 500 block can separate one or multiple optical bands that are not necessarily adjacent. In one or more embodiments, the split block 400 in FIG. 5A is designed to separate a continuous spectrum of bands or to separate multiple bands.

Figures 7A, 7B:
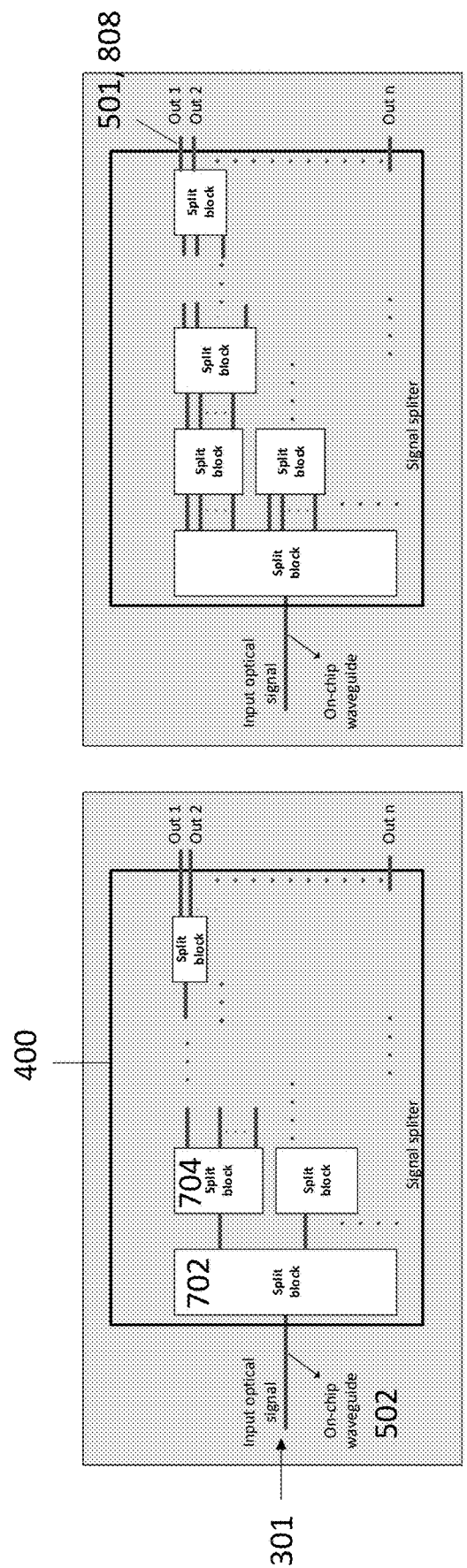

FIG. 7 illustrates an example wherein the signal splitter block 400 includes a block (coarse splitter 702) that does a coarse split of the optical signal into two or multiple sub-bands with multiple waveforms in each sub-band. The sub-bands may include one or multiple bands that are not necessarily adjacent. As further illustrated in FIG. 7, each sub-band is then fed into finer resolution splitter blocks (fine resolution splitter 704) to further separate the bands. The splitter blocks can be chained (or positioned in a chain configuration) so that eventually the desired output optical signals are achieved. In one or more embodiments, an array waveguide grating is used for each of these blocks. In various examples, the split block 400, 702, 704 is designed through optimization of a patterned photonic structure.

While multiple splitters 500 can be used, in other examples, only a single split block is used to split the bands.

Example Filters and Dispersive Blocks

Figure 8:
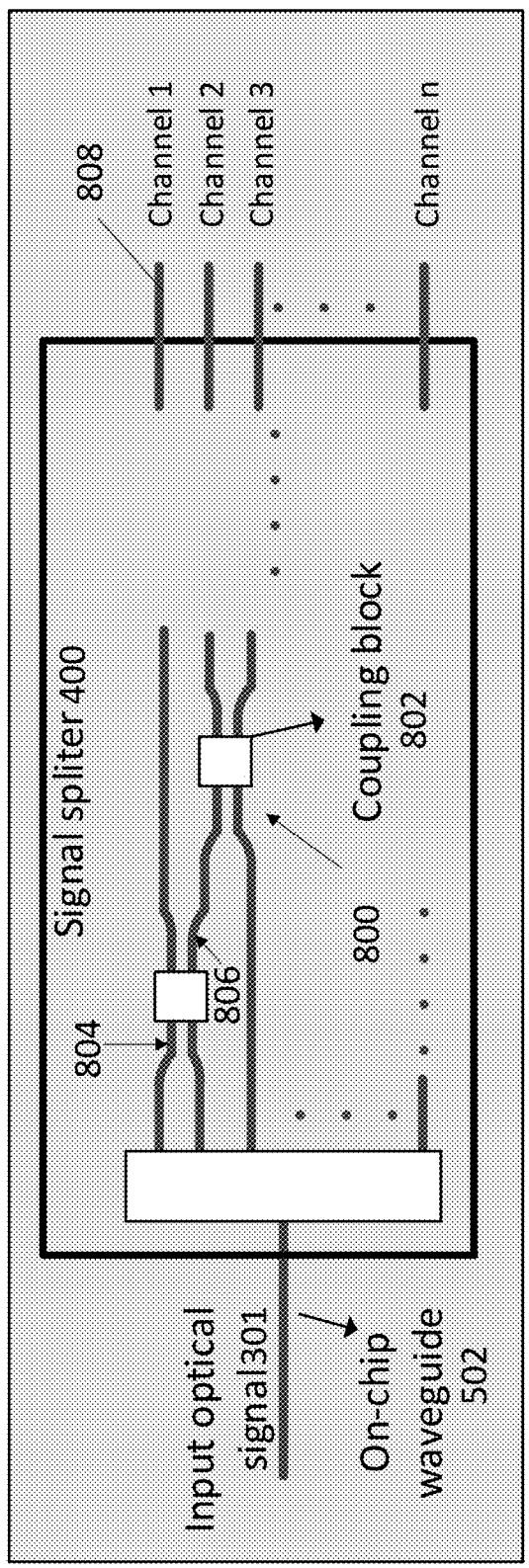
FIG. 8 illustrates an example wherein the input signal is split into multiple channels and the resulting channels are further combined in a controlled way by adjusting the coupling block to achieve the desired transfer functions from the input to the output channels. The desired transfer function is (but not limited to) precise separation of the channels with minimum guard band width.

FIG. 8 illustrates an example wherein the splitters 500 comprise photonic filters 800 implemented using a network of couplers 802 that outputs the waveform bands. The couplers 802 (comprising input waveguide 804 and output waveguide 806) are designed differently for each block 500 and the overall performance is designed to achieve the desired transfer functions T(f) from the input optical signal to the output channels. In one embodiment, the desired transfer function is to minimize the leakage between the output channels 808 and separate the waveforms with high out-of-band rejection with the minimum guard band width.

Figure 9:
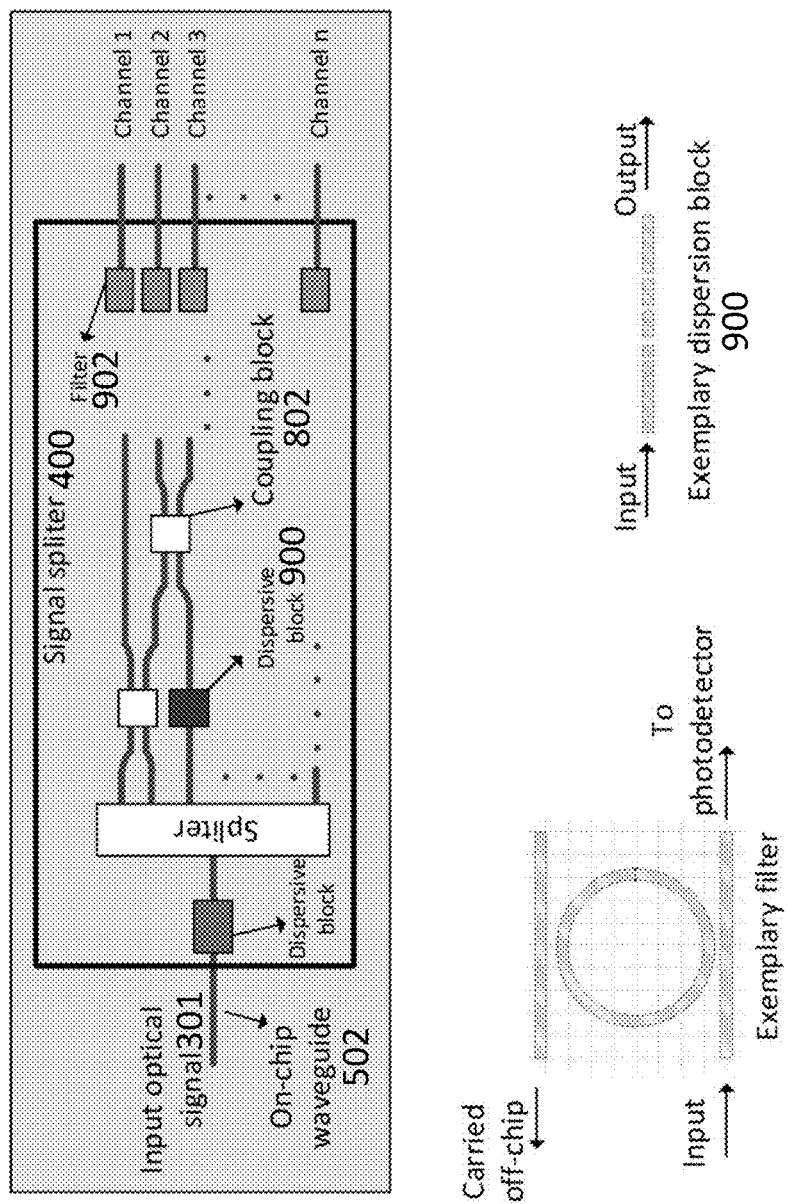
FIG. 9 illustrates an exemplary schematic of a device including dispersive blocks used to adjust and shape the optical signal so that the performance of the splitter is improved, and an output filter used to further define the optical transfer function from the input to the output channels.

FIG. 9 illustrates and example wherein the splitter 500 further includes dispersive photonic structures 900 on the chip and the dispersive photonic structures are used to perform further adjustments to the modulated signals. In the embodiment illustrated in FIG. 9, the dispersive blocks 900 are embedded in the splitter block 400 to improve the performance of separating the waveforms 200. FIG. 9 further illustrates an example wherein an output filter 902 is used to further define the optical transfer function from the input to the output channels.

Example Modulation, Heterodyne Mixing, and Electronic Control Configurations

In one or more examples, one or several reference signals are added to the optical signal (carrier 301) and are used for heterodyne mixing in the photodetectors and creating a frequency offset between the modulated waveform and the output electrical signal of the photodetector. In certain embodiments, the reference signal is used to extract the phase/frequency modulation on the optical waveform.

FIG. 10A illustrates an example wherein the reference signal 1000 is in the same band as the waveform and FIG. 10B illustrates an example wherein the reference signal is not in the same band and has a dedicated band. The reference signal of each band is separated by the splitter block to the same output as the waveform is.

Figure 11:
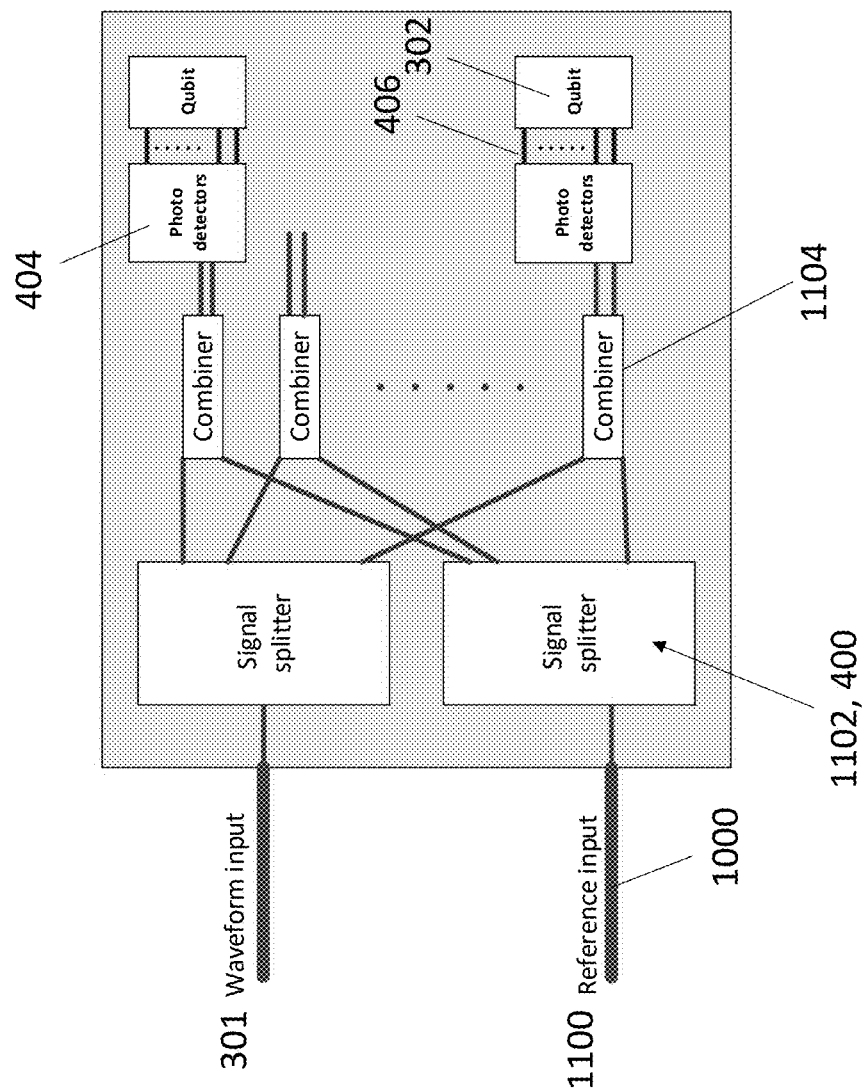
FIG. 11 shows an exemplary schematic of the design in which a reference input is also provided to the chip which can be split into multiple channels or bands, combined with the waveform signals, and fed to the photodetectors.

FIG. 11 illustrates an example wherein a separate optical signal 1100 with the reference signals is fed to the chip and a splitter block 1102 is used to separate the reference signals and then reference signals are combined in a mixer or combiner 1104 with the waveforms 200 of the bands to produce the electrical signals 406 through heterodyne mixing.

In one or more embodiments, the reference signals are modulated waveforms that are heterodyne mixed with the waveforms in the bands to generate the desired electrical signals at the output of the photodetectors. In one embodiment, a comb waveform is used for the reference signals and its tones are used as the reference signals.

In various examples, the reference signal is amplitude-squeezed light or phase-squeezed light, e.g., so that the system achieves improved noise performance (e.g., lower noise).

In one or more embodiments, the modulated waveforms are compensated for the leakage between the splitting channels and pre-adjusted such that after the split with the leakage between the bands, the desired waveform is output by the photodetector.

In one or more embodiments, the split blocks are actively adjustable with electronic control to tune them for increased performance (e.g., reduced noise).

Example Photodetectors

In one or more embodiments, the photodetector 404 receives the optical signal and generates an output electromagnetic field excited by its output current. Example photodetectors include, but are not limited to, a photodetector comprising an optical non-linear material that generates a microwave/RF output signal in response to the input light signal or signals. In one or more embodiments, attenuator blocks are used after the photodetector to adjust the signal level of the high signal-to-noise ratio signals for the qubits. In one or more embodiments, the photodetector is frequency selective and converts a band of the optical signal. In one or more embodiments, the photo detector is frequency selective and converts a band of the optical signal while passing the rest of the optical signal to the next photodetector.

Example Interface Configurations

Figure 12:
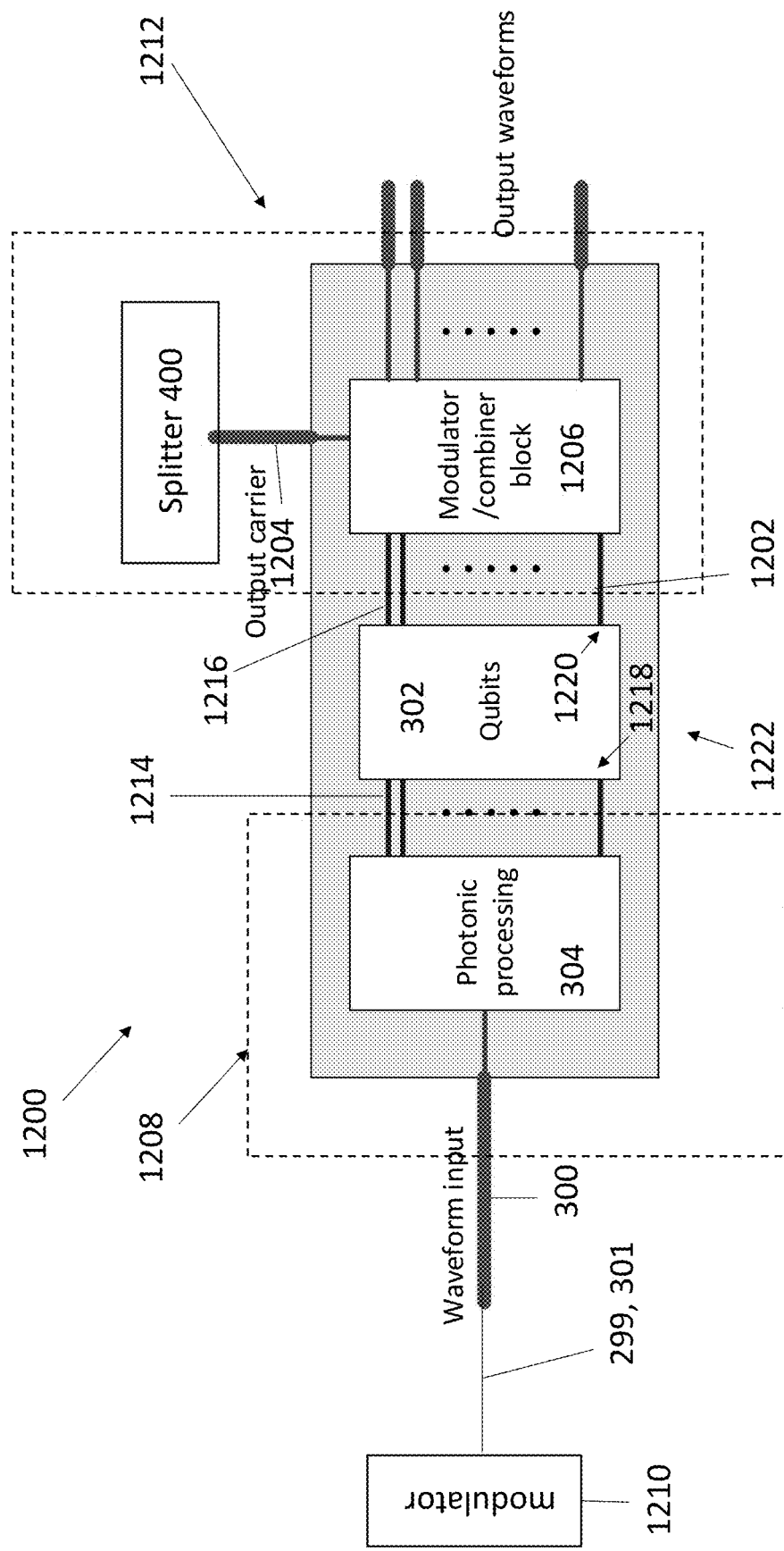
FIG. 12 shows an exemplary schematic of the design in which the output signals of the qubits are modulated on one or multiple optical carriers and transferred outside of the chip for further processing.

FIG. 12 illustrates an example quantum chip 302 wherein the output electrical waves 1202 outputted from the qubits 303 are placed on an optical carrier 1204 by modulation in a modulator 1206 and subsequently transferred off the chip 302. In one embodiment, the optical carrier 1204 is used to carry multiple waveforms outside of the chip. In one or more further embodiments, the residual optical signals are coupled out of the chip and transferred to a higher temperature chamber away from the quantum chip. In various examples, the residual optical signals are converted to electrical waves (microwave/RF) and transferred outside of the quantum chip environment.

FIG. 12 further illustrates an example device 1200 comprising a first interface 1208 including or coupled to a first modulator 1210 combining the waveforms 200 onto an input carrier 301; photonic components 304 comprising a splitter 400 splitting the waveforms 200 from the carrier signal 301 so that the waveforms 200 may be transmitted as input signals 1212 to the qubits 303. The device further includes a second interface 1214 receiving output waveforms/signals 1216 from the qubits in response to the input signals 1212. The second interface 1214 comprises a second modulator 1206 modulating the output waveforms onto an output (e.g., optical) carrier 1204; and splitter 400 for separating the output waveforms 1216 from the output carrier 1204 to a processor off the chip 302 for further processing.

In one or more embodiments, the modulator 1206 comprises an electronic chip (e.g., at low temperature) modulating the optical signals and placing the waveforms 200 on the carriers with low noise.

As illustrated in FIG. 12, the quantum chip 302 includes input ports 1218 for inputting input signals 1212 to the qubits 303 and output ports 1220 outputting output signals 1216 from the qubits 303.

In one or more embodiments, the optical signals 1204 are used to transfer signal (comprising output waveforms 1216) from one or multiple qubit 303 to another or multiple other qubits. In one or more embodiments, the optical signal(s) 1204 connecting two or multiple qubits 303 is used to entangle the qubits.

As illustrated in the example of FIG. 12, one or more of the quantum chip 302 (quantum part comprising qubits), the photonic chip 306 (photonic part comprising splitters), and the electronics comprising the modulator 1206 are co-integrated on a single chip 1222.

Example Noise Mitigation Schemes

Figure 13C:
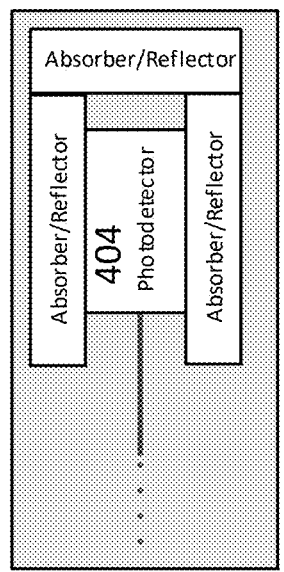
Figure 13B:
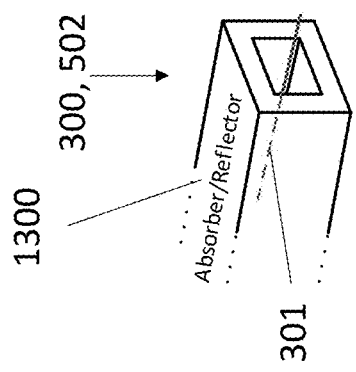
Figure 13A:
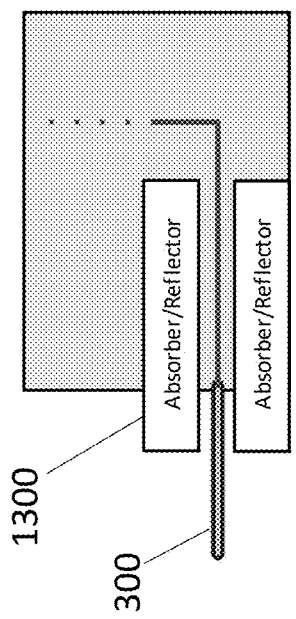

FIG. 13A illustrates an example comprising an absorber or reflector wall 1300 inserted to block the stray light from the coupling point to the photodetectors 404. FIG. 13B illustrates an example wherein the input fiber 300 and on-chip waveguide routings are surrounded with light absorbing material to block the stray light and leakage reaching the photodetectors. FIG. 13C illustrates an example wherein photodetectors are enclosed with a metallic or reflective or absorptive material to block the stray light hitting the photodetectors. In one or more embodiments, Germanium is deposited in the etched grooves patterned around the photonic blocks to absorb the stray light.

Device Embodiments

Illustrative, non-exclusive examples of inventive subject matter according to the present disclosure are described in the following enumerated paragraphs:

1. A device (401), comprising:
one or more splitters (500) (e.g., optical splitters) splitting (e.g., de-modulating, separating, or extracting) a plurality of spectrally separated signals (201) from a carrier (299) (e.g., optical carrier) and outputting the signals (201) to a plurality of outputs (501), wherein the signals (201) comprise at least one of:
a plurality of input signals (1212) delivered to the one or more qubits (303) for and/or exciting or controlling the one or more qubits (303), or
a plurality of output signals (1216) received from the one or more qubits (303) and used to read one or more states of the one or more qubits (303).

2. The device of example 1, further comprising:
a photonic integrated circuit (304a) comprising the splitters (500) and one or more waveguides (502) coupled to the splitters (500) to transmit the carrier (299) to the splitters; and
a quantum chip (302) comprising one or more of the qubits (303), the quantum chip (302) comprising at least a plurality of input ports (1218) or a plurality of output ports (1220), wherein:
each of the input signals (1212) are delivered to the quantum chip (302) through a different one of input ports (1218) and each of the output signals (1216) are outputted from the quantum chip (302) through a different one of the output ports (1220); and
the quantum chip (302) and the photonic integrated circuit (304a) are on separate chips or integrated on the same chip.

3. The device (401) of examples 1 or 2, further comprising:
a modulator (1206) modulating a carrier with the different signals (201) having different frequencies to form the carrier (299);
one or more waveguides (502, 300) coupled to the modulator (1206) and the splitters (500) to transmit the carrier (299) to the one or more splitters (500); and
one or more interfaces (305, 1208, 1214) for connecting to one or more systems (302) each comprising or implementing the one or more qubits (303), each of the interfaces (305) comprising:
the one or more splitters (500); and
one or more detectors (404) (e.g., photodetectors) coupled to the outputs (501), detecting each one of the signals (201), and converting the signals (201) to a plurality of electrical signals (406). In various examples, the one or more interfaces are connected to the one or more systems so that the electrical signals (406) comprise at least one of the input signals (1212) delivered to the one or more qubits (303) or the output signals (1216) split from the carrier after output from the one or more qubits (303), modulation on the carrier in the modulator, and transmission on the carrier to the splitters.

4. The device (401) of any of the example 3, wherein the carrier (299) comprises electromagnetic radiation (e.g., an optical carrier, e.g., comprising visible or infrared wavelengths) transmitted through one of the waveguides (502, 300) and the electrical signals (e.g., radio frequency or microwave signals 406) control or excite the qubits (303).

5. The device (401) of any of the examples 3-4, wherein the electrical signals (406) comprise a response of the one or more qubits (303) to an excitation (e.g., input signals 1212) and the electrical signals (406) comprising output signals (1216) are used to measure the one or more states of the one or more qubits (303).

6. The device (401) of any of the examples 3-5, wherein the systems (302) comprise a quantum chip (302) including the one or more qubits (303) and the device (401) further comprises a photonic chip (306) including photonic components (304) or a photonic integrated circuit (304a) including the detectors (404) and the splitters (500).

7. The device (401) of any of the examples 3-6, wherein the interfaces (305) comprise:
a first interface (1208) comprising the outputs delivering the electrical signals (406) as the input signals (1212) to control and/or or excite the one or more qubits (303); and
a second interface (1214) comprising the modulator modulating the output signals (1216) outputted from the one or more qubits (303), the one or more waveguides transmitting the carrier, the splitters, and the detectors, wherein the electrical signals are used to read the one or more states of the one or more qubits (303) in response to the input signals (1212) inputted to the qubits (303).

8. The device (401) of any of the examples 1-7, further comprising a plurality of the splitters (500) connected by one or more of waveguides (502), each of the plurality of splitters (500) (1) splitting one of the signals (201) from the carrier (299); (2) having one of the outputs (501) and outputting the one of the signals (201) to the one of the outputs (501); and (3) transmitting a remainder of the signals (201) on the carrier (299) through one of waveguides (502) to a next one of the splitters (500).

9. The device (401) of any of the examples 1-8, further comprising a plurality of the splitters (500) comprising a coarse splitter (702) connected to one or more finer resolution splitters (704), the coarse splitter (702) splitting the carrier (299) into two or more frequency bands and the one or more finer resolution splitters (704) splitting each of the frequency bands into a plurality of sub-bands or channels (402) each comprising one of the signals (201).

10. The device (401) of any of the examples 1-9, wherein each of splitters (500) comprise a filter or coupler (802).

11. The device (401) of any of the examples 1-9, wherein each of the splitters (500) comprise a ring resonator (504).

12. The device (401) of any of the examples 1-11, wherein one or more of the splitters (500) each comprise:
an input waveguide (804) spatially separated from, and evanescently coupled to, an output waveguide (806), the input waveguide (804) transmitting a plurality of the signals (201) on the carrier (299) and the output waveguide (806) evanescently coupling one of the signals (201) from the input waveguide (804) and transmitting the one of the signals (201) to one of the outputs (501).

13. The device (401) of any of the examples 1-12, wherein one or more of the splitters (500) comprise or are coupled to a dispersive element (900) adjusting at least one of a frequency or shape of the signals (201).

14. The device (401) of any of the examples 1-13, further comprising a patterned photonic structure (600) including the splitters (500), wherein:
the patterned photonic structure (600) comprises a plurality of regions or pixels (602) each having a different refractive index,
the splitters (500) each comprise one or more of the regions or pixels (602), and
the pixels (602) or regions are arranged to tailor or optimize (e.g., via inverse design) a transfer function T(f) of the splitting of the signals (201) from the carrier (299).

15. The device (401) of example 14, wherein the pixels or regions are arranged to minimize leakage between the signals (201) and/or minimize a guard band between the signals (201) on the carrier (299).

16. The device (401) of any of the examples 3-15, further comprising:
a mixer (1104) mixing a reference signal (1000) with the signals (201) so that the signals (201) comprise modulated signals (201), wherein the detector (404) comprises a heterodyne detector demodulating each of the modulated signals (201) to obtain one of the electrical signals (406).

17. The device (401) of any of the examples 3-16, wherein at least one of the waveguides (502) or the photodetector (404) comprise walls (1300) including at least one of an absorber or reflector blocking or reducing cross-talk between the signals (201) in different channels.

18. The device (401) of any of the examples 1-17, wherein at least one of the waveguides (502) comprises an optical fiber (300) transmitting the carrier (299) comprising electromagnetic radiation having a bandwidth of at least 2 GHz and carrying the signals each having a bandwidth less than 100 MHz (or less than 30 MHz) with optional guard-bands of 20 MHz or less between each of the signals.

19. The device (401) of any of the examples 1-18, wherein the signals (201) comprise a waveform (200) having one or more frequencies, one or more phases, and one or more amplitudes, and an envelope 203 shaping the waveform (200).

20. The device (401) of any of the examples 1-19, wherein the interfaces (305, 1212, 1208) are connected to the systems (302) so that the output signals (1216) received from one or more of the qubits (303) are transmitted as the input signals (1212) to another of the qubits.

21. The device (401) of any of the examples 1-20, wherein the electrical signals (406) comprise microwave or radiofrequency signals and information in the signals is represented as a voltage or current.

22. The device (401) of any of the examples 1-21, wherein the systems (302) comprise a superconductor, a charge qubit, a semiconductor, a magnetic material, or defects in a solid state system.

22. The device (401) of any of the examples 1-22, wherein the qubits comprise one or more transmon qubits and the input signals are delivered to the XY Drive ports and Z Drive ports of the transmon qubits and the output signals are received from read out ports of the transmon qubits.

23. The device of any of the examples 1-22, wherein the qubits comprise spin qubits comprising spin states.

24. The device of any of the examples 1-23, wherein the carrier comprises an optical carrier having an (e.g., optical) frequency of 1 Terahertz (THz) or more (at least 1 THz) or a wavelength in a range of 400 nm to 300 microns or 400 nm to 10 microns.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:
one or more qubit interfaces comprising a plurality of ports for transmitting input signals to, and/or receiving output signals from, one or more qubit systems comprising one or more qubits, the one or more qubit interfaces comprising:
one or more splitters configured for splitting a plurality of spectrally separated input signals from a carrier and outputting the spectrally separated input signals to a plurality of outputs from the splitters, the spectrally separated input signals for at least exciting or controlling the one or more qubits,
and
a modulator for modulating a carrier with a plurality of the output signals received from the one or more qubits.

2. The device of claim 1, further comprising:
a photonic integrated circuit comprising the splitters and one or more waveguides coupled to the splitters to transmit the carrier to the splitters; and
a quantum chip comprising one or more of the qubits system, the quantum chip comprising at least a plurality of input ports or a plurality of output ports, wherein:
each of the spectrally separated input signals are delivered to the quantum chip through a different one of input ports and each of the output signals are outputted from the quantum chip through a different one of the output ports; and
the quantum chip and the photonic integrated circuit are on separate chips or integrated on the same chip.

3. The device of claim 1, further comprising:
one or more detectors coupled to the outputs of the splitters and detecting each one of the spectrally separated input signals, the detectors converting the spectrally separated input signals to a plurality of electrical or electromagnetic signals for input to the one or more qubits.

4. The device of claim 3, wherein:
the one or more qubit systems comprise one or more quantum chips including the one or more qubits and the device further includes a photonic chip including the detectors and the splitters; and
wherein the carrier comprises electromagnetic radiation comprising optical or infrared wavelengths transmitted through one or more waveguides to the splitters.

5. The device of claim 3, wherein the qubit interfaces comprise:
a first interface delivering the electrical or electromagnetic signals as the one or more input signals to control and/or or excite the one or more qubits; and
a second interface receiving the output signals from the one or more qubits in response to the input signals.

6. The device of claim 3, further comprising:
a mixer mixing a reference signal with the input signals to form modulated signals, wherein the one or more detectors comprise a heterodyne detector demodulating each of the modulated signals to obtain the electrical or electromagnetic signals.

7. The device of claim 3, wherein the qubit interfaces are connected to the qubit systems so that the output signals received from one of the qubits in one of the qubit systems are fed as the input signals to another of the qubits in a different one of the qubit systems.

8. The device of claim 1, wherein the output signals comprise electrical or electromagnetic signals comprising a response of the one or more qubits to an excitation and the electrical or electromagnetic signals are used to measure the one or more states of the one or more qubits.

9. The device of claim 1, further comprising a plurality of the splitters connected by waveguides, each of the plurality of splitters:
splitting one of the input signals from the carrier,
having one of the outputs and outputting the one of the input signals to the one of the outputs,
transmitting a remainder of the input signals on the carrier through one of waveguides to a next one of the splitters.

10. The device of claim 1, further comprising a plurality of the splitters comprising a coarse splitter connected to one or more finer resolution splitters, the coarse splitter splitting the carrier into two or more bands and the one or more finer resolution splitters splitting each of the bands into a plurality of sub-bands or channels each outputted to one of the outputs.

11. The device of claim 1, wherein each of splitters comprise a filter or coupler.

12. The device of claim 1, wherein each of the splitters comprise a ring resonator.

13. The device of claim 1, wherein one or more of the splitters each comprise:
an input waveguide spatially evanescently coupled to an output waveguide, the input waveguide transmitting the plurality of the input signals and the output waveguide evanescently coupling one of the input signals from the input waveguide and transmitting the one of the input signals to one of the outputs.

14. The device of claim 1, wherein one or more of the splitters comprise a dispersive element adjusting at least one of a frequency or shape of the input signals.

15. The device of claim 1, further comprising a patterned photonic structure including the splitters, wherein:
the patterned photonic structure comprises a plurality of regions or pixels each having a different refractive index,
the splitters each comprise one or more of the regions or pixels, and
the pixels or regions are arranged to tailor or optimize a transfer function of the splitting of the signals from the carrier.

16. The device of claim 15, wherein the pixels or
regions are arranged to minimize leakage of the input signals between the outputs and minimize
a guard band between the input signals in the carrier.

17. The device of claim 1, comprising one or more photodetectors and waveguides coupled to the splitters, wherein at least one of the waveguides or the photodetectors comprise walls including at least one of an absorber or reflector blocking leakage of the signals between the outputs.

18. The device of claim 1, wherein the qubit systems comprise a superconductor, a semiconductor, a magnetic material, or defects in a solid state system.

19. The device of claim 1, wherein the carrier is an optical carrier.

20. A method of interfacing with one or more qubits, comprising:
modulating a carrier with different signals having different frequencies;
transmitting the carrier to one or more splitters;
splitting the signals from the carrier in the splitters;
outputting the signals from the splitters from a plurality of outputs;
detecting each one of the signals outputted from the outputs, the detecting converting the signals to a plurality of electrical or electromagnetic signals; wherein the electrical or electromagnetic signals are delivered to the one or more qubits.

* * * * *